United States Patent Office 2,809,113
Patented Oct. 8, 1957

2,809,113

INCREASING THE PROTEIN CONTENT OF MILK PRODUCTS

Edwin G. Stimpson, Sayville, and Harold Young, Babylon, N. Y., assignors, by mesne assignments, to National Dairy Products Corporation, New York, N. Y., a corporation of Delaware No Drawing. Application April 10, 1953, Serial No. 348,098

15 Claims. (Cl. 99—9)

The present invention relates to a high-protein material useful in animal feeds and to a process of making the same which comprises converting a material rich in carbohydrate and low in protein content into a material appreciably higher in protein content and lower in carbohydrate content.

Every year thousands of tons of waste materials are discarded as useless by-products of industry. Many of these waste materials are rich in carbohydrate and low in protein content. It is obvious that an inexpensive process for converting such materials into beneficial and desirable products is greatly needed.

It is known that many organisms convert carbohydrates, particularly sugars, and nitrogen, into carbon dioxide and cell substance, the latter being rich in protein and vitamins. The term "respiration" is used to refer to this oxidation of sugar to carbon dioxide and cell substance. It is to be distinguished from the term "fermentation" which refers in a strict sense to the oxidation of sugar to alcohol and carbon dioxide. The process to be described herein contemplates utilization of the growth of a living organism by respiration.

In accordance with the disclosure of U. S. Patent No. 2,128,845, dated August 30, 1938, entitled "Treatment of Milk Products," to Robert P. Myers and Samuel M. Weisberg, milk products containing lactose can be delactosed by fermentation with a microorganism such as yeast. This is a fermentation process, as distinguished from respiration, which is the present process, for the patented process is carried out under conditions which result in a conversion of lactose to carbon dioxide and alcohol without appreciably increasing the protein content. The process of the instant invention is aerobic under conditions which stimulate the growth of the yeast and thus results in an increase in the protein and vitamin content of the starting material being treated.

The propagation of living organisms such as yeast has long been practiced commercially to make the organism available in quantity. The processes have been controlled in order to produce the maximum possible yield of organism and all of the processing conditions are directed to this end. The liquor containing the oragnism is flltered to recover the organism and the filtrate eventually is discarded, although in a continuous process it may be returned to the fermentor after being refortified.

Organisms such as yeast recovered following processes of this sort have been utilized as components of animal feeds. However it has been recognized that fresh yeast cells are utilized in metabolic processes of the animal only to the extent of about 50% of their caloric and protein content. It is thought that the digestive juices are incapable of attacking the yeast cells fully.

In accordance with this invention, in contrast to prior processes, living organisms are grown under conditions favoring respiration and the production of a maximum amount of protein, utilizing as nutrient media materials which have a high carbohydrate content and a low initial protein content. Organisms of a carbohydrate-assimilating strain are capable of converting the carbohydrate content of such media into protein provided, of course, that there is an ample supply of simple nitrogen and the medium is balanced in respect to other nutrients.

The process of this invention comprises, broadly, the steps of propagating a living organism of a carbohydrate-assimilating protein-producing strain under conditions favoring respiration in a nutrient medium comprising a high carbohydrate, low protein material and then treating the liquor containing the organism to make cell substance of the organism more available for utilization in animal metabolic processes and recovering the whole of the resulting mixture as a high protein product. In the process of the invention the organism is not separated from the liquor in which it is grown as in the prior art processes of propagating organisms, for the object is not so much the growth of the organism as the production of a high protein nutrient medium useful as an animal and poultry feed or as a component thereof.

The treatment of the organism-containing liquor to make the cell substance more available to the animal can be effected in various ways as hereinafter set forth, of which a preferred method comprises heating the liquor and the organism at an elevated temperature above about 150° F. and preferably within the range from 160 to 200° F. for a short time, usually at least about ten seconds. After this treatment the liquor can be used as such or concentrated to a higher solids content or dried under conditions ensuring preservation of as much of the nutrient value of the material as possible.

The process of this invention is applicable to microorganisms of all types which are capable of assimilating carbohydrates in growth. Examples of such organisms are the lactose- and glucose-fermenting yeasts such as *Saccharomyces fragilis, Oidium lactis, Saccharomyces flava lactis, Saccharomyces cerevisiae, Zygosaccharomyces lactis, Saccharomyces lactis, Torulopsis lactis, Torulopsis cremoris, Torulopsis kephir, Torulopsis sphaerica, Torulopsis lactosa, Torulopsis lactis condensi, Torulopsis globosa,* and *Torulopsis utilis.* Other yeasts capable of assimilating lactose, glucose, fructose or sucrose can also be used. In addition, various glucose- and lactose-fermenting molds such as *Aspergillus niger, Aspergillus flavus, Aspergillus flavipes, Aspergillus sydowi, Aspergillus flavus oryzae, Fusarium lactis* and *Penicillium notatum* and *chrysogenum* can also be employed. The term "organism" as used in this specification and the appended claims will be understood to refer to any of the above classes of organisms.

As examples of low-protein, high-carbohydrate containing materials which can be used as nutrient media in the process of the invention, there can be mentioned wheys such as casein whey, and various types of cheese wheys such as Swiss, Limburger, cottage cheese and Cheddar cheese wheys, or the mother liquor plus wash water residues obtained in the manufacture of lactose. In addition to whey, the process can also be used to advantage with other milk products, such as skim milk, buttermilk, condensed skim milk, skim milk powder, whey powder and buttermilk powder, the powders upon reconstitution with water. Low-protein, high-carbohydrate materials other than those derived from milk to which the process is applicable include wheat flour, corn meal, corn flour, corn steep liquor and maize flour. A further and important embodiment of the invention includes the application of the process to carbohydrate waste materials derived from the paper, canning and citrus, i. e., grapefruit, lemon and orange, industries, such as citrus molasses, citrus pulp, citrus press liquor, blackstrap mclasses, sulfite waste liquor, vegetable canning wastes such as asparagus butts, beet, carrot and cabbage trimmings, corn husks and cobs, green bean snips and culls, Lima bean and pea vines, tomato culls, skins and cores, and spinach trimmings, canning pear wastes, peanut protein waste liquors and olive pomace, to name but a few. Most of the materials named are high in carbohydrate content and some of them can serve as nutrient media without any preliminary treatment. However, in the case of sulfite waste liquor, olive pomace and other materials having a high cellulose content, it may be necessary to convert the cellulose to sugars by conventional hydrolysis techniques prior to the employment of the materials as nutrient media. Similarly, it may be necessary to convert starch to sugars by such techniques in the case of those materials having a high starch content prior to their use as nutrient media.

Additional carbohydrates can also be added to the liquor in order to increase the yields of protein. Materials such as glucose and lactose, for example, are readily available and inexpensive and, therefore, useful for this purpose.

The particular combination of nutrient medium and living organism to be employed in any given process will, of course, be dependent upon the carbohydrate available in the source material. That is, if the nutrient medium contains lactose, as in the case of whey, a lactose-assimilating organism should be used. In the case of corn and wheat flour, it is necessary to use an organism capable of assimilating glucose, and in the case of mixtures of whey and corn flour, or wheat flour, it is necessary to employ a strain or mixture of strains capable of assimilating both lactose and glucose.

Factors which are regulated in the propagation process of the invention include aeration, temperature and pH. Additionally, there should be maintained a maximum concentration of actively growing organism at all times and a sufficient concentration of nutrient medium to provide food for the organism. It is preferred to employ a continuous or semi-continuous process in which the nutrient medium is added continuously to a fermentor in which the propagation is taking place and, if desired, high-protein liquor is simultaneously withdrawn.

Aeration is important in avoiding the production of alcohol and obtaining high yields of protein. If the aeration of the nutrient medium is supplemented by additional means of agitation, such as by a mechanical agitator, from 0.1 to 1.0 volume of air per volume of liquor per minute is satisfactory. It is not essential, however, that separate means of agitation and aeration be provided because air may be so introduced that the air itself will effectively agitate the liquor.

If aeration has to serve to agitate the liquor as well, from 0.5 to 2.5 volumes of air per volume of liquor per minute are desirable. When no additional source of agitation is employed, rates lower than 0.5 volume of air per volume of liquor per minute lead to increased alcohol production and lower yields of organism. With a combination of aeration and agitation it is possible to establish a continuous process in which the yield of organism in a unit time is at least several times that of a batch process under similar growth-favoring conditions.

As the aeration rates are increased foaming may become a problem and actually the degree to which foaming is controlled may, to a certain extent, govern the maximum amount of air which is desirably introduced into the liquor. Anti-foaming agents can be added to reduce foam. Silicone resins, soy beam oil, and waxes such as a mixture of paraffin wax with glycerol monostearate (available commercially under the name Nopco 1909 B) are recommended anti-foam agents.

The optimum pH of the nutrient liquor will depend to a certain extent upon the organism selected. However, in the case of the majority of yeasts and molds, a pH within the range of from 3.5 to about 7.5, preferably between 4.2 and 5.2, is satisfactory. The desired pH may be attained by addition of lactic acid or other non-toxic organic acids, or a mineral acid such as sulfuric, hydrochloric and phosphoric acids. When whey is used as the base liquor, preferably the desired pH is achieved by allowing the whey to undergo a nature fermentation which results in the formation of lactic acid by the action of lactic acid bacteria and lowers the pH. An increased acid content also preserves the whey until it is used in the fermentation process.

There should be an adequate supply of available nitrogen in the fermentation liquor for synthesis of protein. Many nutrient media contain sufficient available nitrogen. However, in the case of whey and other media which are low in available nitrogen, it is necessary to add a source of inorganic nitrogen such as urea or ammonia. For yeasts and molds it is desirable to have present from 0.05% to about 0.6% available nitrogen (calculated as N) in the nutrient medium.

The preferred source of available nitrogen is ammonia because ammonia will not disturb the mineral balance of the final product, is inexpensive, neutralizes acidity and assists in bringing the pH to within the desired range. Inorganic salts such as diammonium phosphate or ammonium sulfate can be used, these being particularly useful when an adjustment in the mineral balance of the product is desired.

Within the fermentor it is desirable to maintain the concentration of organism at the maximum possible without overcrowding. This concentration for yeast is from one to three billion cells per ml., and for molds about 2% by weight of the medium. A continuous or semi-continuous process provides a convenient method for maintaining the concentration of growing organism within the fermentor at an optimum and also provides a convenient method for maintaining a constant and adequate, but not excessive, supply of nutrient medium.

The preferred temperature within the fermentor is within the range of 80 to 100° F., preferably about 86° F.

The starting nutrient media should be pasteurized in order to destroy bacteria contained therein and sanitary conditions should be maintained throughout the process.

The process, as previously indicated, is preferably performed as either a continuous or semi-continuous process. Both have been found highly successful. The two types of processes can be illustrated as follows:

A continuous process is useful for yeast and molds. A fermentor having an agitator of special design for dispersion of air and control of foam is employed. In starting operation, the fermentor is filled to two-thirds capacity with any desired nutrient medium. The medium is then inoculated with living organism, in the case of yeast, in sufficient quantity to obtain a cell concentration of 250 to about 700 million cells per ml. and, in the case of molds, from 1 to 2% by weight of the medium. Agitation and aeration at the rate of about 0.1 to 1.0 volume of air per volume of liquor per minute are begun while heating at a temperature between 80° and 100° F. The pH of the liquor is preferably maintained between 4.2 and 5.2. After the yeast cell concentration has increased to between one and two billion cells per ml. or the mold concentration to 2% by weight (approximately four hours), additional nutrient medium is fed in at the rate of one-fourth the volume of liquor in the fermentor per hour. This rate should be varied in accordance with the material being treated so as to provide a constant source of nutrient without providing an excess of carbohydrate. When the fermentor is full, withdrawal of liquor is begun at the same rate and the process operation thereafter is continued indefinitely.

A semi-continuous process is most useful to grow yeast. Agitation is effected by aeration alone. In starting the operation, the fermentor is filled to 20% capacity with prepared nutrient medium and inoculated with living organism as in the continuous process. Aeration is then begun at a rate of 0.5 to 2.5 volumes of air per volume of liquor per minute and the liquor is heated to a temperature of from 80° to 100° F. After approximately four hours of operation, when the yeast cell count is between one and two billion cells per ml., additional nutrient medium is fed in at the rate of one-fourth the total volume of liquor in the fermentor per hour. Each hour the rate is increased to maintain the same proportion of one-fourth the volume of liquor in the fermentor until the fermentor becomes full, when either the operation is stopped, or if desired, the process thereafter is operated continuously by maintaining a constant and equal rate of feed and withdrawal of the liquor.

The recovered fermented liquor then is treated so as to make the cell substance more available to the animal for utilization in metabolic processes. The various methods for effecting this now will be discussed.

The cell walls of the organism can be shattered with the aid of ultrasonic waves. The organism can be disintegrated and killed by autolysis, which may be assisted by adjustment of pH and/or the temperature, and holding for a sufficient time. An organic solvent such as toluene can be used to increase the rate of autolysis and the solvent is subsequently removed from the material. Repeated freezing and thawing of the liquor containing the organism will kill the organism and break the cells. Plasmolysis, which is the release of the cell nutrients to the liquor without rupturing the cell walls can also be effected by concentration of the liquor.

A method which is preferred because of its ease of operation and which is fully effective for this purpose comprises heating the organism-containing liquor at an elevated temperature above about 150° F. and preferably within the range of 160 to 200° F. for a short time. Usually ten seconds is adequate, but the time factor is not critical nor is the temperature, except that times and temperatures would not be used which would tend to decrease the nutritive value of the material either by decomposition of vitamins or like undesirable results. In this connection it may be noted that heating at low temperatures of the order of 100° F. and below is not effective. The following data shows the effectiveness of the heat treatment to increase the availability of cell substance:

Samples of yeast containing nutrient liquor (obtained by propagation following the process of Example 2 which follows) were heated by immersion in boiling water to the temperatures indicated in the table and these temperatures maintained for fifteen seconds. After heating, each sample was divided into two aliquots, one of which was analyzed for niacin and thiamine content and the other of which was deproteinated by addition of lime followed by filtration to remove precipitated solids and then analyzed for thiamine and niacin.

TABLE I

| Sample | Temperature, °F. | Time,[1] minutes | Deproteinated[2] | Thiamine | Niacin |
|---|---|---|---|---|---|
|  |  |  |  | (expressed in micrograms/gm.) |  |
| 1 | Room | 0 | No | 0.145 | 0.12 |
|  | Room | 0 | Yes | 0.098 | 0.15 |
| 2 | 160 | 2 | No | 0.321 | 0.31 |
|  | 160 | 2 | Yes | 0.243 | 0.31 |
| 3 | 180 | 3 | No | 0.318 | 0.24 |
|  | 180 | 3 | Yes | 0.289 | 0.42 |
| 4 | 190 | 4 | No | 0.304 | 0.29 |
|  | 190 | 4 | Yes | 0.294 | 0.34 |
| 5 | 212 | 6 | No | 0.321 | 0.31 |
|  | 212 | 6 | Yes | 0.335 | 0.27 |

[1] From 130° F. until temperature was reached.
[2] Deproteination removes yeast cells from the mixture and shows vitamins left in solution and presumably released by the heat treatment.

Heating at 160° F. to 212° F. for fifteen seconds as shown in the table definitely increases the concentration of vitamin materials in the liquor. This is evident from a comparison of the results for both the deproteinated and non-deproteinated aliquots, for sample 1, which received no heat treatment, with the other samples. The vitamin content of the non-deproteinated and deproteinated liquors is appreciably higher for samples 2, 3, 4 and 5, which had been heated at 160° to 212° F., than for sample 1, which received no heat treatment.

The product which has been treated to make the cell substance more available is ready for use as a liquid animal and poultry feed or as a component in liquid animal and poultry feeds. For convenience in handling, however, the composition can be concentrated to a higher solids content, say from 20 to 75% solids, using elevated temperatures of the order of 100 to 190° F. and desirably under vacuum so as to permit the lowest possible concentration temperatures which would not affect the nutrient values of the material.

The material can also be dried for use in dry feed preparations. Vacuum and tray drying processes are satisfactory but spray drying of the concentrated liquor at air inlet temperatures within the range of 200 to 300° F. and air outlet temperatures of from 130 to 205° F. is a preferable drying procedure. It is desirable that the material have a pH within the range of from about 6 to about 7 during the drying to avoid decomposition of various components thereof, particularly protein. The material can be brought to a pH within this range by addition of acidic or alkaline reacting materials, depending upon its initial pH. In most instances the liquor will have a pH on the acid side and this can be adjusted to 6 or 7 by addition of lime.

The material recovered as a solid or liquid product following the process of the invention has a high vitamin content, a high protein content and a low carbohydrate content. The proportions of these nutrients will, of course, vary with the organism and the nutrient medium employed in the propagation. In many cases it is possible to utilize the product as an animal feed without supplementation through addition of other materials. In other cases the material can be utilized as a special diet for various purposes. A balanced feed for animal and poultry use can be prepared by blending other nutrient materials including carbohydrate, mineral salts, etc., in the proportions proper to compensate for any nutritive deficiencies of the material. The art well knows the requirements for diets for various purposes in the feeding of animals and poultry and therefore further details of diets and feed formulations need not be given here. The product of this invention may also have a valuable role in human nutrition and for use in microbiological media.

The following examples further illustrate the invention.

EXAMPLE 1

This is an example of the aerated, agitated, continuous process.

Dried "Krafen" Cheddar cheese whey was reconstituted with water to 6% solids and 1% of lactic acid (50% edible grade) and 0.4% aqua ammonia were added to the whey to give a resultant pH of 4.4.

The medium was pasteurized at 170° F., with no holding, and held at at least 140° F. until used. Eight gallons of the prepared medium were placed in a fermentor equipped with a mechanical agitator and the remainder held as feed nutrient. The medium in the fermentor was cooled to 86° F. and S. fragilis yeast cake added to a concentration of 330 million cells per ml. The agitator was started and aeration was begun at the rate of 0.1 volume of air per volume of liquor per minute. When the yeast cell count had increased to 1.2 billion cells per ml., the feed liquor was started slowly into the fermentor at a rate of one-fourth of the total volume in the fermentor or two gallons per hour. This rate of feed was continued for five days, collecting the overflow (yeast and liquor) in the receiving tank. The yeast liquor in the receiving tank was heated for a few minutes to a temperature of 180° F. to release cell substance of the yeast into the liquor, concentrated to a 30% solids content and then spray-dried at an inlet air temperature of 300° F. and an outlet air temperature of 170 to 180° F. The materials balance of the dried product follows:

|  | Starting Material,[1] Percent | Final Product, Percent |
| --- | --- | --- |
| Total solids | 100.00 | 100.00 |
| Lactose | 70.88 | 4.05 |
| Acid (as lactic acid) | 16.37 | 20.25 |
| Protein [2] | 11.22 | 36.17 |

[1] Nutrient medium minus yeast.
[2] Protein = (Total N − free $NH_3$) × 6.38.

The high protein content of the final product is noteworthy. Comparison with the starting material shows the protein content of the final product was almost twice that of the starting material while the lactose content was reduced from 121 lbs. to 3.52 lbs. In this low proportion the lactose will not produce undesirable cathartic effects. The ash content of the final product was substantially unchanged. The product is useful as an animal feed supplement or as a component of an animal feed.

EXAMPLE 2

This example illustrates the aerated, semi-continuous feeding process.

A quantity of cottage cheese whey (6% solids) was allowed to "ripen" (develop acid by natural fermentation) to 0.70% lactic acid. Sufficient 50% aqueous lactic acid solution (edible grade) was added to the whey to increase the acidity to 1%. There was then added 0.4% of aqua ammonia, bringing the pH to 4.8. The whey was then pasteurized at 170° F. with no holding and kept hot, the temperature being maintained at least at 140° F., until fed to the fermentor. Two gallons of the prepared whey were mixed with an equal volume of water, reducing the solids content to 3%, and introduced into the fermentor. Sufficient *S. fragilis* yeast cake was added to the fermentor to provide a starting yeast cell count of about one billion cells per ml. Aeration was begun at a rate of two volumes of air per volume of liquid per minute while maintaining the temperature at 86° F. The fermentation was allowed to proceed until the yeast cell count reached two billion cells per ml. and no lactose was detectable in the starting medium, this initial fermentation requiring about four hours. At this point, there was introduced into the fermentor a continuous flow of undiluted (6% solids) fortified cottage cheese whey at the rate of one-fourth the total volume of the liquor in the fermentor per hour. Each hour the feed rate and aeration rate was increased to maintain the feed ratio to compensate for the increase in volume of the liquor within the fermentor. When the fermentor became full the feeding was stopped and the aeration allowed to continue for an additional hour. The liquor within the fermentor was then withdrawn and quickly heated to 180° F. and held at that temperature for a few minutes to release yeast cell substance into the liquor and concentrated to a 30% solids content under vacuum at 100° F. The liquid concentrate was a high-protein product suitable for incorporation in animal feeds.

The analysis of the final product on a solids basis is compared below to the starting whey:

|  | Initial Whey | Final Product |
| --- | --- | --- |
| Total solids | percent | 100.00 | 100.00 |
| Lactose | do | 67.92 | 1.44 |
| Ash | do |  | 22.02 |
| Acidity | do |  | 13.04 |
| Protein | do | 13.71 | 37.0 |
| Niacin | mcg./g |  | 12.46 |
| Thiamine | mcg./g |  | 15.94 |
| Pyridoxine | mcg./g |  | 34.20 |
| Riboflavin | mcg./g |  | 62.03 |
| Folic acid | mcg./g |  | 2.55 |

The amount of dry yeast formed per pound of lactose fermented was 0.30.

A comparison of the final product with the initial product shows that the protein content was increased from 13.71% to 37.0% while the lactose content was reduced from 67.92% to 1.44%. Appreciable quantities of vitamins also were present in the final product. The final product can be utilized as a component of an animal feed.

EXAMPLE 3

The procedure of this example was an exact duplication of the procedure in Example 2 except that casein whey of 6% solids content was used as the nutrient medium instead of cottage cheese whey and 1% lactic acid was added to the whey instead of "ripening" the whey by a lactic fermentation. The chemical analysis showed:

|  | Initial Whey | Final Product |
| --- | --- | --- |
| Total | percent | 100.00 | 100.00 |
| Lactose | do | 76.00 | 1.71 |
| Ash | do | 11.36 | 27.73 |
| Acidity | do | 5.12 | 20.54 |
| Protein | do | 7.14 | 39.30 |
| Niacin | mcg./g | 9.5 | 28.77 |
| Thiamine | mcg./g | 7.3 | 25.68 |
| Pyridoxine | mcg./g | 5.65 | 104.12 |
| Riboflavin | mcg./g | 24.1 | 71.92 |
| Folic acid | mcg./g | 2.5 | 5.24 |

In this example, there was produced 0.35 pounds of dry yeast per pound of lactose fermented.

By the process of the invention the lactose content of the initial whey was reduced from 76.0% to 1.71% and the protein content increased from 7.14% to 39.30%. At the same time appreciable quantities of niacin, thiamine, pyrodoxine, riboflavin and folic acid were formed in the material. The product can be used as such as an animal feed supplement or can be blended with other nutrient materials to produce an animal feed useful for any desired diet.

EXAMPLE 4

The apparatus employed in this example was a vessel equipped with means for both aeration and agitation. The fermentation medium was reconstituted (6% solids) dried Cheddar cheese whey to which 0.3% diammonium phosphate had been added. The pH of the medium was adjusted to 4.5 with sulfuric acid and the medium was pasteurized at 140° F. for thirty minutes. Nine gallons of the above medium were cooled to 86° F. and placed in the fermentor, and a 2% inoculum of *Aspergillus niger* added. Agitation and aeration at the rate of 0.5 volume of air per volume of liquor per minute were begun and fermentation was allowed to proceed for twenty-four hours at which point feeding of additional medium was begun at the rate of 1.25 gallons of liquid medium per hour with a simultaneous drawoff of the same amount of fermented medium. The operation was allowed to proceed continuously at this rate for forty-eight hours. The yield of mold cells was 2% on a liquid medium basis. The harvested liquor was heated to 160° F. to release cell substance and was then condensed and spray-dried as in Example 1. The analysis of the final dried product showed:

|  | Initial Whey, percent | Final Product, percent |
| --- | --- | --- |
| Total solids | 100.00 | 100.00 |
| Ash | 8.10 | 14.1 |
| Reducing sugar as lactose | 70.88 | 36.0 |
| Protein | 11.22 | 18.0 |

The results show that molds are not as useful as yeasts in increasing the protein content of whey at the expense of lactose content, but a significant reduction of lactose content was obtained, in this case from 70.88% to 36.0%, and the protein content was increased from 11.22% to 18.0%. This product had a higher lactose content than those made with yeasts, but is nonetheless useful as a component of an animal feed.

EXAMPLE 5

The apparatus used in this example was a twenty gallon stainless steel fermentor equipped with means for aeration and feeding of liquid.

Sixteen pounds of lactose mother liquor plus wash water residue (a waste material from the manufacture of lactose from whey, having the following chemical composition: total solids, 36.7%; lactose, 19.7%; ash, 11.8%; total nitrogen, 0.54%; copper, 10 p. p. m.) was added to fourteen gallons of water. One percent lactic acid and 0.4% aqua ammonia were added to the solution giving a resultant pH of 4.5. Four gallons of the above medium were placed in the fermentor, pasteurized at 170° F. with no holding period, cooled to 86° F. and inoculated with 2.2 lbs. of *S. fragilis* yeast cake. Aeration was begun at the rate of two volumes of air per volume of liquor per minute. As soon as the lactose in the starting four gallons of liquor had disappeared, feeding of additional medium was begun at the rate of one-fourth of the total volume of liquor in the fermentor per hour. (The remainder of the medium had been previously pasteurized by steam injection at 170° F. and the medium was held hot to prevent contamination.) Each hour both the feed rate and the aeration rate were adjusted to compensate for the increase in volume in the fermentor. When the feeding was complete the medium was allowed to ferment for an additional hour in order to utilize residual lactose or any alcohol which may have accumulated in the fermentor. The whole of the product liquor was then heat treated at 190° F. for five minutes, to release cell substance, condensed, and spray-dried as in Example 1. The following tables give a summary of the operation and a comparison of the starting medium and the final high-protein product:

TABLE II

*Summary of operation*

| | |
|---|---|
| Total solids feed | percent 6.85 |
| Lactose in feed | do 3.52 |
| Ash in feed | do 1.92 |
| Total nitrogen in feed | do 0.16 |
| Free NH₃ nitrogen in feed | do 0.08 |
| Acidity in feed material (calc. as lactic acid) | percent 0.27 |
| Total volume liquid fermented | gals 10 |
| Total weight lactose fermented | lbs 2.9 |
| Total yeast collected (wet—25% solids) | lbs 5.5 |
| Total yeast collected (dry) | lbs 1.38 |

TABLE III

| | Starting Mother Liquor Wash Water | Final Product |
|---|---|---|
| Total solids...........percent | 100 | 100 |
| Lactose..............do | 51.35 | 4.1 |
| Ash..................do | 28.01 | 50.76 |
| Acidity (as lactic)...do | 3.93 | 1.53 |
| Protein [1]..........do | 7.46 | 26.22 |
| Niacin...............mcg./g | 30.7 | 29.6 |
| Thiamine.............mcg./g | 4.7 | 8.75 |
| Folic acid...........mcg./g | 0.64 | 1.67 |
| Pyridoxine...........mcg./g | 4.62 | 33.4 |
| Riboflavin...........mcg./g | 32.8 | 49.8 |
| Pantothenic acid.....mcg./g | 193.7 | 274.0 |

[1] Protein calculated by subtracting the free ammonia nitrogen from the total nitrogen and multiplying by 6.38.

In this case the lactose content of the mother liquor plus wash water residue was reduced by the process of the invention from 51.35% to 4.1%, the ash content increased from 28.01% to 50.76% and the protein increased from 7.46% to 26.22%. The contents of folic acid and pyridoxine also were increased.

The product is useful as a component of an animal feed or can be fed separately as a supplement.

EXAMPLE 6

The fermentor employed in this example was the same as that in the preceding example. Ten pounds of citrus molasses were diluted with fifteen gallons of water to a sugar content of about 9 to 12% (15–20° Brix) and there was added 0.4% diammonium phosphate and 0.1% sodium phosphate. The pH was brought to 4.5 and four gallons of the medium thus prepared were placed in the fermentor, pasteurized at 170° F., with no holding, and then cooled to 86° F. Aeration was begun at the rate of 1.8 volumes of air per volume of liquor per minute. Sufficient freshly prepared *Torula utilis* was inoculated into the nutrient medium to result in a starting yeast cell count of 750 million cells per ml. Fermentation was allowed to continue until the yeast cell count reached 1.24 billion cells per ml. At this point additional feed material (which had been previously pasteurized at 170° F. and kept hot) was fed into the fermentor at a rate of one-eighth of the total volume in the fermentor per hour. After the first hour the feed rate was increased to one-fourth of the total volume in the fermentor per hour. When the fermentor became full the run was stopped and the liquor within the fermentor was heated to 190° F. for a few minutes to release cell substance to the liquor and was then condensed and spray-dried as in Example 1. The pH throughout the fermentation was maintained at between 4.2 and 4.7.

In the following table there is presented a comparison of the analysis of the starting medium and the analysis of the final product.

TABLE IV

| | Starting Medium | Final Product [1] |
|---|---|---|
| Total solids...........percent | 100 | 100 |
| Ash...................do | 9.84 | 15.71 |
| Total remaining solids as glucose...do | 34.43 | 5.94 |
| Total acidity as citric...do | 22.66 | 32.06 |
| Sucrose...............do | 21.96 | 7.64 |
| Protein...............do | 10.14 | 23.03 |
| Thiamine.............mcg./g | 9.66 | 17.16 |
| Niacin................mcg./g | 45.15 | 117.93 |

[1] No alcohol was present.

The glucose content of the citrus molasses was reduced by the process of the invention from 34.43% to 5.94% and the sucrose content was reduced from 21.96% to 7.64%. The protein content was increased from 10.14% to 23.03% and the thiamine and niacin contents also were appreciably increased. The product can be fed directly as a supplement or can be blended with other nutrient materials to form a diet for a regular or special purpose.

EXAMPLE 7

The aerated, semi-continuous process was employed in the fermentation of whole Cheddar cheese whey. The whey was prepared by allowing it to "ripen" with lactic acid bacteria to a pH of 4.0 to 4.5. 0.4% ammonia (29% NH₃) was added which resulted in a pH of 4.5 to 5.0. The whey was heated to 140° F. and held at this temperature until used in the process. A portion of the whey was pasteurized at 170° F., with no holding, cooled to 86° F. and introduced in an amount equal to one-fourth the volume of the fermentor as a starting medium. Sufficient *S. fragilis* yeast cake was added to the starting medium to give a count of 800 million to one billion cells per ml. Aeration was begun at the rate of 1.7 to 2.0 volumes of air per volume of liquor per minute. After the yeast concentration had increased to 1.5 to 2.0 billion cells per ml., feeding of additional whey begun at the rate of one-fourth the volume of liquor in the fermentor per hour. The feeding was continued until the fermentor was full and then stopped but aeration was continued for an additional hour. The material in the fermentor was heated for a few seconds at 180° F. to liberate cell substance into the liquor and was then condensed and barreled. The results are tabulated as follows:

TABLE V

*Summary of operation*

| | |
|---|---|
| Total solids feed | 6.3%. |
| Percent alcohol produced | 0.21. |
| Total lactose fermented | 5 lbs. (2270 grams). |
| Total volume whey fermented | 15 gal. |
| Total yeast recovered | 9.25 lbs. (4200 grams). |
| Initial yeast added | 2.64 lbs. (1200 grams). |
| Total yeast made (wet) | 6.6 lbs. (3000 grams). |
| Total yeast made (dry) | 1.96 lbs. (894 grams). |
| Y/L ratio (wet) [1] | 1:0.74. |
| Y/L ratio (dry) [1] | 1:2.5. |

[1] Y/L=yeast to lactose ratio or the number of parts of lactose necessary to produce one part of yeast.

TABLE VI

*Analysis of product*

| | | |
|---|---|---|
| Total solids | percent | 100 |
| Lactose | do | 3.15 |
| Ash | do | 17.2 |
| Acidity | do | 17.8 |
| Protein [1] | do | 45.8 |
| Niacin | mcg./g | 21 |
| Thiamine | mcg./g | 17.8 |
| Folic acid | mcg./g | 6.3 |
| Pyridoxine | mcg./g | 42.0 |
| Riboflavin | mcg./g | 22.4 |
| Pantothenic acid | mcg./g | 129.5 |

[1] Percent protein = (percent total nitrogen − percent free ammonia $N_2$) × 6.38.

EXAMPLE 8

Three thousand gallons of fresh Cheddar cheese whey were pumped into a tank and allowed to ripen to 0.7% lactic acid. One thousand seven hundred and seventy gallons of this whey was pumped into another tank and heated to 140° F. to arrest further acid development. To this whey was added 0.4% dibasic ammonium phosphate. The remainder of the 3,000 gallons of whey were left in the first tank and allowed to build up acid by natural fermentation.

Three hundred gallons of prepared feed whey were pumped into the vat of an apparatus similar to that of Example 1, cooled to 86° F. and inoculated with thirty five pounds of *Saccharomyces fragilis*. More yeast and nutrient whey were added until a good starting count of yeast cells was obtained. The data for the starting liquor is reproduced below:

TABLE VII

*Preparation of ripened whey starting and feed material*

| | | |
|---|---|---|
| Volume whey | gals | 1770 |
| Total solids in whey | percent | 4.9 |
| Ammonium hydroxide (27% $NH_3$) | lbs | 56 |
| pH of whey feed | | 4.5 |
| Acidity of whey feed (ripened) | percent | 0.54 |
| Air rate | cu. ft./min | 13 |
| Starting count (cells/ml.) | | 250×10⁶ |

The apparatus was operated for seventy-two hours at a temperature of 86° F. The yeast volume built up to 5% in twenty-two hours and thereafter the yeast volume was maintained from 5 to 6% until the end of the operation. The liquor harvested from the apparatus had a solids content of 3.0%, and the composition given in column 3 of the table below, which table also lists comparable whey materials:

TABLE VIII

| Solids | Fresh Original Whey (percent) | High Protein Delactosed Whey (percent) | 50-50 Solids Mixture of Whole Whey and High Protein Delactosed Whey (Condensed) (percent) |
|---|---|---|---|
| Total solids content | 5.42 | 2.60 | 42.1 |
| Lactose·$H_2O$ | 3.79 | 0.09 | 14.8 |
| Acidity as lactic | 0.08 | 0.48 | 6.80 |
| Ash | 0.474 | 0.64 | 6.95 |
| Protein | 0.76 | 1.07 | 10.7 |

Two thousand gallons of the liquor harvested from the apparatus were mixed with six hundred forty gallons of a 5% solids freshly ripened whey containing 1.0% lactic acid. The mixed whey and high protein yeast liquor were then condensed to 42% solids.

A portion of the condensed product having a 42% solids content was then spray-dried at an inlet air temperature of 300° F. and an outlet air temperature of 170–180° F. In the following table, there is reproduced the composition of the dried material together with the composition of known whey materials with which it is comparable:

TABLE IX

| Solids | Fresh Original Whey (percent) | High Protein Delactosed Whey (percent) | 50-50 Solids Mixture of Whole Whey and High Protein Delactosed Whey (Condensed) (percent) |
|---|---|---|---|
| Total solids content | 100 | 100 | 100 |
| Lactose·$H_2O$ | 70.0 | 3.46 | 35.3 |
| Acidity as lactic | 1.48 | 23.0 | 15.5 |
| Ash | 8.75 | 24.6 | 16.6 |
| Protein | 14.01 | 41.0 | 25.4 |
| Vitamin Content (mcg./g.): | | | |
| Riboflavin | 17.8 | | 40.0 |
| Thiamine | 6.28 | | 9.75 |
| Niacin | 6.2 | | 58.5 |
| Pyridoxine | 3.13 | | 16.1 |
| Pantothenic acid | 37.0 | | 74.0 |
| Biotin | 0.27 | | 0.162 |
| Folic acid | | | 4.6 |
| $B_{12}$ | 0.11 | | 0.08 |

The data in the table on the vitamin content of the high protein delactosed whey obtained in this example applies to a product mixed with a proportion of the original untreated whey. The true vitamin content of the dried high protein delactosed whey of this example is as follows:

| | Mcg./g. |
|---|---|
| Riboflavin | 62.2 |
| Thiamine | 13.22 |
| Niacin | 110.8 |
| Pyridoxine | 29.07 |
| Pantothenic acid | 111.0 |
| Folic acid | 9.07 |

In Examples 1, 4 to 6 and 8 the products were dried and used in the dry state. It will be understood, however, that the process could be halted after the material has been concentrated to a higher solids content as in Example 7. The concentrated material is useful in preparing a liquid animal feed concentrate and can be used as such or can be blended with other components as those skilled in the art are aware to produce diets for any desired purpose.

EXAMPLE 9

One hundred gallons of high protein delactosed whey was prepared according to the aerated, semi-continuous process using reconstituted spray-dried Cheddar cheese whey. When fermentation was complete the pH of the medium was raised to 5.2, one hundred milliliters of toluene added and the temperature raised to 100° F. The material was held at this temperature for thirty hours, after which twenty-five gallons was removed and filtered through a filter press. Both portions, the unfiltered seventy-five gallon portion and the twenty-five gallon portion, were condensed to a paste. The analytical data is given in Table X. The summary indicates the yields when both the filtered and unfiltered products are calculated to one hundred gallon volumes for comparative purposes.

The product was useful as an animal feed supplement, bacterial nutrient and food product. The filtered product would be used where the material must be free from suspended matter. As the table shows the unfiltered material has a higher nitrogen content:

other materials and therefore by a proper choice of yeast, many nutrient variations can be achieved. The proportion of protein and carbohydrate can be adjusted by adjusting the carbohydrate content of the starting nutrient material. If more carbohydrate is added than is necessary or utilizable by the organism, at the conclusion of the process a carbohydrate-containing liquor will be obtained. If less carbohydrate is added than can be utilized, the protein content will be limited. These and other changes can be made as well by adding sugars and/or protein etc. to the finished product.

It is evident that the product of the invention can be utilized not only for animal and poultry feeds but also for other purposes as, for example, in human nutrition, and in the propagation of bacteria, molds, and yeast.

All parts and percentages in the specification and claims are by weight.

TABLE X

| | Whey Before Nutrients Added | Whey After Nutrients Added | Medium After Fermentation | Medium After Autolysis | Medium After Autolysis, Filtered | Medium After Drying, Autolyzed | Medium After Drying, Autolyzed and Filtered |
|---|---|---|---|---|---|---|---|
| Volume_____gal__ | 100 | 101 | 100 | 100 | 25 | | |
| Weight_____lbs__ | 830 | 839 | 830 | 830 | 207.5 | | |
| Total Solids_____percent__ | 4.62 | 4.61 | 2.36 | 2.56 | 1.77 | 100 | 100 |
| Total Nitrogen_____do____ | 0.09 | 0.10 | 0.11 | 0.11 | 0.05 | 4.29 | 2.82 |
| Amino Nitrogen_____do____ | 0.005 | 0.01 | 0.015 | 0.04 | 0.04 | 1.56 | 2.26 |
| Ash_____do____ | | | | 0.39 | 0.47 | 15.4 | 26.6 |

| Summary | Calculated on 100 gal. Basis | |
|---|---|---|
| | Filtered | Not Filtered |
| Lbs. Amino $N_2$ in Autolysate/100 lbs. solids_____ | 1.68 | 1.68 |
| Percent Nitrogen in Autolysate present as amino $N_2$___ | 76.5 | 35.9 |
| Percent original nitrogen recovered as amino $N_2$___ | 35.9 | 35.9 |
| Percent original nitrogen recovered in autolysate__ | 73.5 | 100 |

EXAMPLE 10

Wet yeast cake (100 g. 25% solids) slurried in six hundred cc. of water containing 0.15% potassium diacid phosphate was run through a sonic vibrator of the type described in application Serial No. 322,874. The feed rate was 315 cc. per minute under a pressure of 12 lbs. per square inch. The inlet temperature was 53° F. and the outlet temperature 56.2° F. while no sound was being applied. The inlet temperature was 52° F. and the outlet temperature 65.1° F. while sound was being applied. The total time of application of sound was 1 hour and 20 minutes. The plate voltage was 1680 volts and the plate current 280 milliamps. The crystal voltage was 170 volts and the crystal current 6.6 amps.

The amino nitrogen content of the starting liquor 0.015% and the amino nitrogen of the effluent 0.023% showing that the supersonic treatment was effective in releasing cell nutrients to the liquor. The lactase activity of the product was good. The effluent from the vibrator was filtered to remove yeast cells and degras, and the filtrate assayed for amino nitrogen.

The product varies from the yeast extract known to the art because the yeast is not recovered from the nutrient medium but is autolyzed within the medium and the entire liquor, i. e., yeast and nutrient, is condensed and dried. Filtration is optional depending on the final use of the product.

It is evident that by the process of this invention with the proper choice of starting high carbohydrate, low protein material, organism such as yeast or mold, and growth period, final products of varied low carbohydrate and high protein contents can be prepared. The various yeast strains also produce amino acids, enzymes, vitamins and

We claim:

1. A process for appreciably increasing the protein content of milk products having a high lactose content which comprises aerobically propagating a lactose-assimilating organism selected from the group consisting of molds and yeasts in an aqueous nutrient medium based essentially upon a milk product containing added essential organism nutrients comprising from about 0.05 to about 0.6% available nitrogen, maintaining in the course of the propagation a pH within the range from about 3.5 to about 7.5 and a temperature within the range from about 80 to about 100° F. with aeration within the range from about 0.1 to 2.5 volumes of air per volume of nutrient medium per minute, the propagation of the organism increasing the protein content of the mix while reducing the lactose content, and then treating the resulting mix to release organism cell substance into the aqueous nutrient medium, and yield a fluid product having a high protein and a low lactose content.

2. A process in accordance with claim 1 in which the organism is a mold.

3. A process in accordance with claim 1 in which the organism is a yeast.

4. A process in accordance with claim 3 in which the yeast is *Saccharomyces fragilis*.

5. A process in accordance with claim 1 in which the milk product is whey.

6. A process in accordance with claim 1 in which the milk product is lactose mother liquor plus wash water residue.

7. A process in accordance with claim 1 in which the milk product is skim milk.

8. A process in accordance with claim 1 in which the treatment to release cell substance into the aqueous nutrient medium comprises heating the medium to a temperature within the range from about 160 to about 200° F. until the cell substance content thereof is materially increased.

9. A process in accordance with claim 1 in which the treatment to release cell substance into the aqueous nutrient medium comprises plasmolyzing the organism cells with an organic solvent.

10. A process in accordance with claim 1 in which the treatment to release cell substance into the aqueous nutrient medium comprises freezing and then thawing the medium.

11. A process in accordance with claim 1 in which the treatment to release cell substance into the aqueous nutrient medium comprises subjecting the medium to ultrasonic waves until the cell walls are shattered.

12. A process for appreciably increasing the protein content of milk products having a high lactose content which comprises aerobically propagating a lactose-assimilating organism selected from the group consisting of molds and yeasts in an aqueous nutrient medium based essentially upon a milk product containing added essential organism nutrients comprising from about 0.05 to about 0.6% available nitrogen, maintaining in the course of the propagation a pH within the range from about 3.5 to about 7.5 and a temperature within the range from about 80 to about 100° F. with aeration within the range from about 0.1 to 2.5 volumes of air per volume of nutrient medium per minute, the propagation of the organism increasing the protein content of the mix while reducing the lactose content, and then treating the resulting mix to release organism cell substance into the aqueous nutrient medium, and yield a fluid product having a high protein and a low lactose content and then drying the product.

13. A process in accordance with claim 12 which includes spray-drying the product at a pH within the range from about 6 to about 7 and at an air inlet temperature within the range from about 200 to about 300° F. and an air outlet temperature within the range from about 130 to about 205° F.

14. A process for appreciably increasing the protein content of milk products having a high lactose content which comprises aerobically propagating *Saccharomyces fragilis* in an aqueous nutrient medium based essentially upon whey containing added essential yeast nutrients comprising from about 0.05 to about 0.6% available nitrogen, maintaining in the course of the propagation a pH within the range from about 3.5 to about 7.5 and a temperature within the range from about 80 to about 100° F. with aeration within the range from about 0.1 to 2.5 volumes of air per volume of nutrient medium per minute, the propagation of the yeast increasing the protein content of the mix while reducing the lactose content, and then treating the resulting mix to release yeast cell substance into the aqueous nutrient medium, and yield a fluid product having a high protein and a lactose content below 5% and then drying the product.

15. A process for appreciably increasing the protein content of milk products having a high lactose content which comprises aerobically propagating *Aspergillus niger* in an aqueous nutrient medium based essentially upon whey containing added essential mold nutrients comprising from about 0.05 to about 0.6% available nitrogen, maintaining in the course of the propagation a pH within the range from about 3.5 to about 7.5 and a temperature within the range from about 80 to about 100° F. with aeration within the range from about 0.1 to 2.5 volumes of air per volume of nutrient medium per minute, the propagation of the mold increasing the protein content of the mix while reducing the lactose content, and then treating the resulting mix to release mold cell substance into the aqueous nutrient medium, and yield a fluid product having a high protein and a low lactose content and then drying the product.

References Cited in the file of this patent

UNITED STATES PATENTS

| | | |
|---|---|---|
| 648,468 | Ruckforth | May 1, 1900 |
| 1,806,290 | Griesbach | May 19, 1931 |
| 1,908,512 | Heideman | May 9, 1933 |
| 1,965,355 | Patterson | July 3, 1934 |
| 2,141,455 | Weizmann | Dec. 27, 1938 |
| 2,184,748 | Light | Dec. 26, 1939 |
| 2,567,258 | Pattee | Sept. 11, 1951 |
| 2,609,328 | Reed | Sept. 2, 1952 |
| 2,636,823 | deBecze | Apr. 28, 1953 |

FOREIGN PATENTS

| | | |
|---|---|---|
| 10,981 | Great Britain | of 1900 |

OTHER REFERENCES

Beckwith: Journal of Bacteriology, vol. 32, No. 4, pp. 361–362.

Stumpf et al.: Journal of Bacteriology, vol. 51 (1946).

UNITED STATES PATENT OFFICE

CERTIFICATE OF CORRECTION

Patent No. 2,809,113                              October 8, 1957

Edwin G. Stimpson et al.

It is hereby certified that error appears in the printed specification of the above numbered patent requiring correction and that the said Letters Patent should read as corrected below.

Column 4, line 3, for "nature" read -- natural --; column 8, line 21, in the table, first column thereof, line 1, after "Total" insert -- solids --.

Signed and sealed this 3rd day of December 1957.

(SEAL)
Attest:

KARL H. AXLINE
Attesting Officer

ROBERT C. WATSON
Commissioner of Patents